July 1, 1969  A. J. HUCK ET AL  3,452,670
TOASTER
Filed Aug. 28, 1967  Sheet 1 of 4
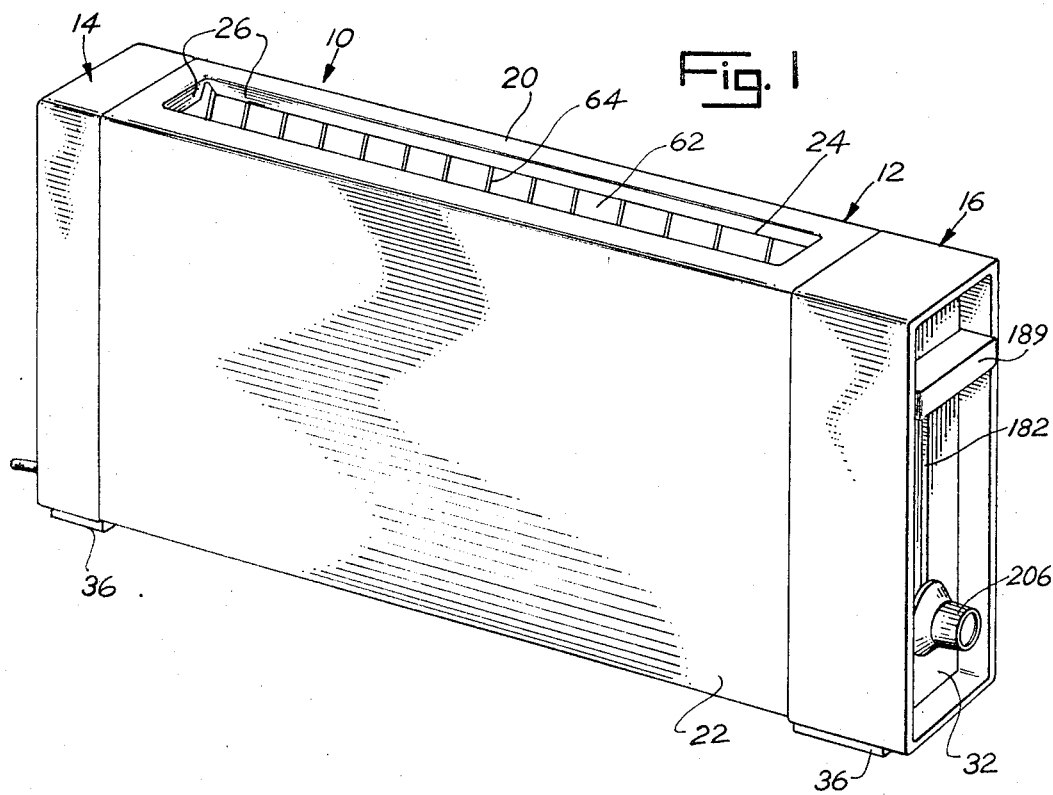
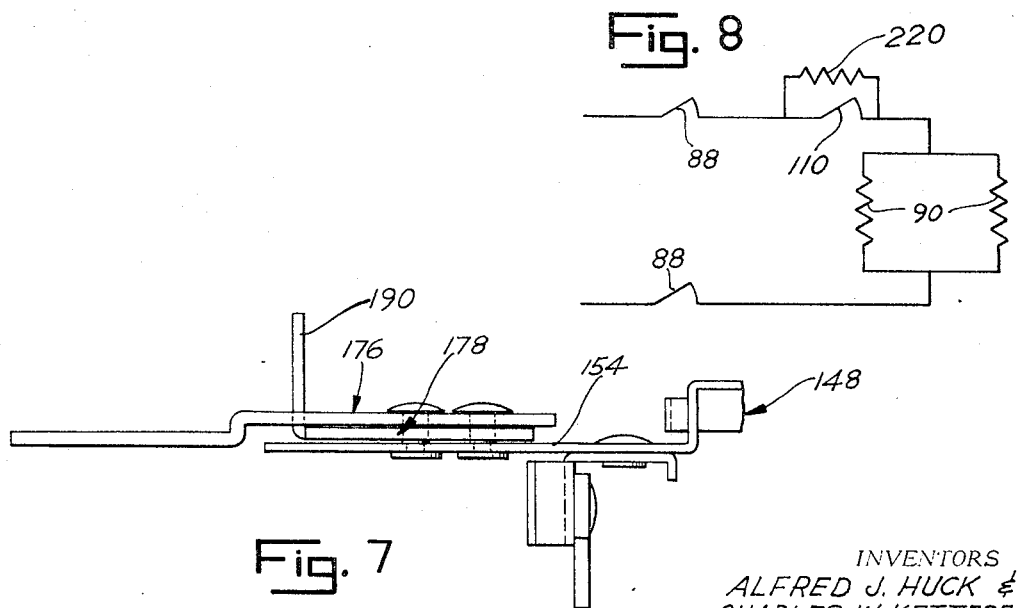
INVENTORS
ALFRED J. HUCK &
CHARLES W. KETTERER
BY Bair, Freeman & Molinare
ATTORNEYS

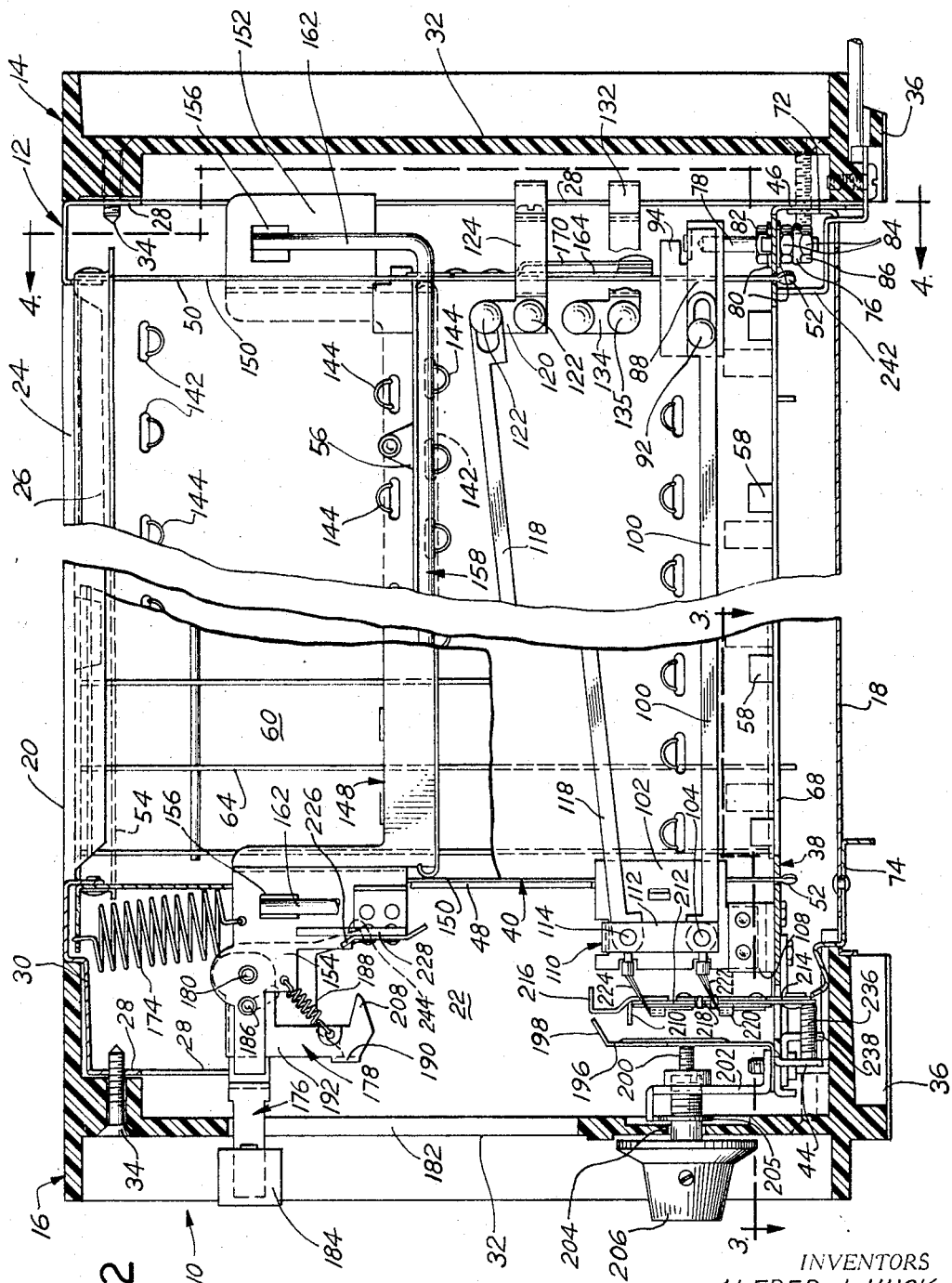

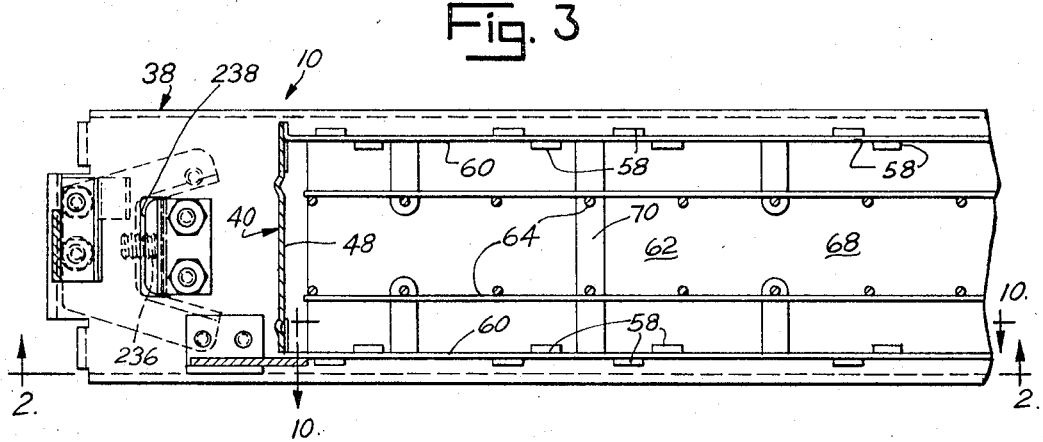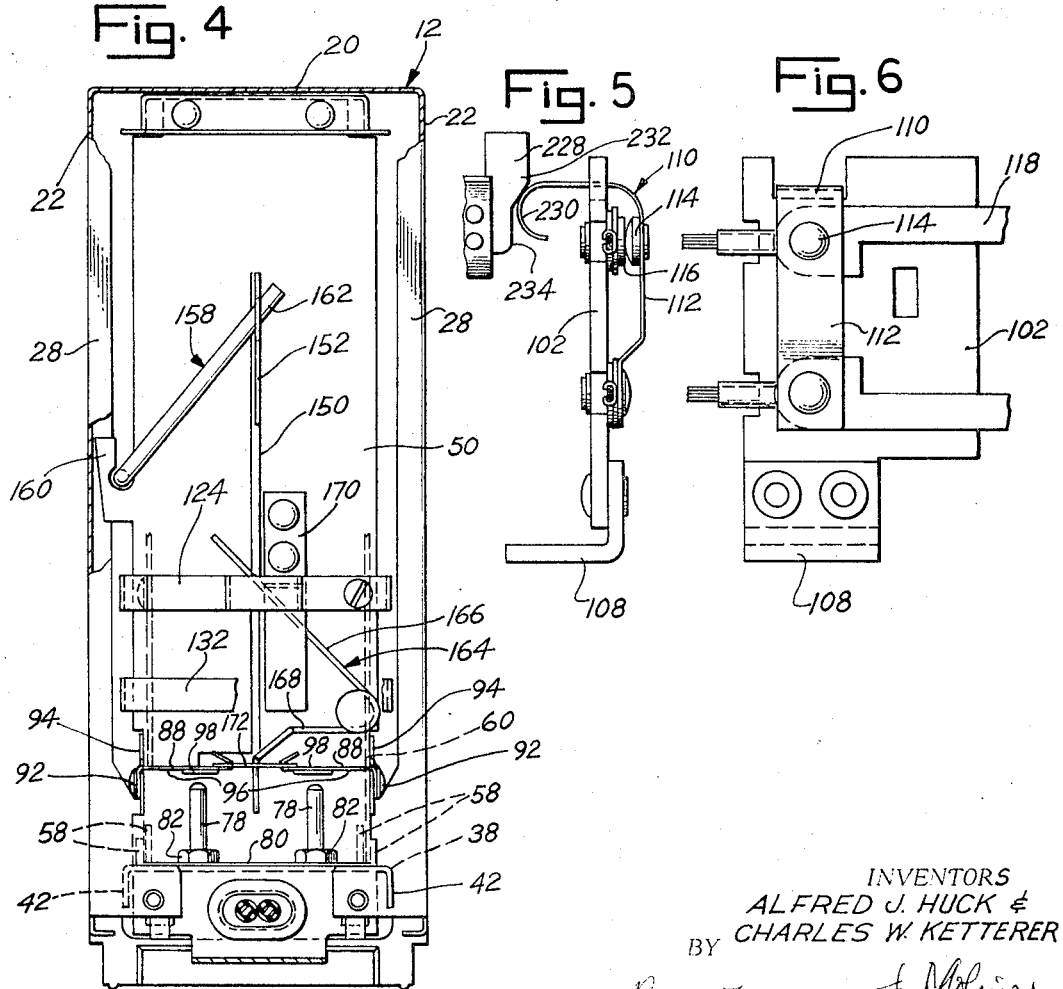

United States Patent Office 3,452,670
Patented July 1, 1969

3,452,670
TOASTER
Alfred J. Huck, St. Louis, and Charles W. Ketterer, Brentwood, Mo., assignors to Knapp-Monarch Company, a corporation of Delaware
Filed Aug. 28, 1967, Ser. No. 663,652
Int. Cl. A47j *37/08;* H05b *3/02*
U.S. Cl. 99—329                                14 Claims

ABSTRACT OF THE DISCLOSURE

A toaster has a bread toasting chamber, a bread carriage movable in the chamber, and a spring for biasing the carriage to the raised position in the chamber. Upper and lower rows of sinusoidal heating elements are mounted upon mica plates which form the sides of an elongated bread toasting chamber. Switches are mounted on the base of the toaster and are closed when the carriage is moved to the lowermost toasting position. A bimetallic toasting time control is used. The bimetal has a first edge secured to it which engages a first hook mounted on the carriage. When heat is applied to a bimetallic heating coil, the bimetallic warping action causes the first edge to move out of engagement with the first hook. When the first hook moves out of engagement, the second edge of the bimetal assembly engages the edge of a second edge on the moving carriage. When the bimetal cools, there is disengagement between the second hook and the second edge and the carriage moves to the raised position.

BACKGROUND OF THE INVENTION

Field of the invention and description of the prior art

This invention relates to an improved toaster and it particularly relates to a toaster with an improved time control and heating element arrangement for the toaster, so as to provide uniform toasting of bread.

Toasters are commonly used home appliances which are found in practically every home. Because of the extensive use of toasters, they must be highly reliable and simple in operation so as to provide a uniform browning of bread regardless of the particular area of the bread being toasted.

The electric toaster market is highly competitive and the provision of highly reliable, efficient toasters which are economical to manufacture is very desirable. Although certain known prior art toasters are of efficient and reliable construction, they are often undesirably expensive and complex in construction and manufacture.

One way to simplify and make a toaster more economical in construction is to eliminate the use of an expensive timer. This has been accomplished by replacing the timer with a bimetallic member which is heated by a resistance coil. As the bimetallic member heats, it distorts or deflects laterally and the bread carriage becomes disengaged from a hooking member carried by the bimetal. At the time of disengagement, the bread carriage rises slightly until another element carried by the bimetal engages a hook member on the bread carriage to continue holding the carriage in the toasting position. Upon the slight raising of the carriage, current no longer passes through the heating coil, permitting the bimetal to cool, causing the bimetal to distort or deflect back to the starting position. Upon the return of the bimetal to the starting position, the carriage becomes disengaged from the bimetal and a spring lifts the carriage to the raised position.

By the described construction the toasting cycle is effectively doubled in length of operation so that a more accurate control may be provided for the toasting. Prior art devices generally having the described type of construction are both complex and expensive, and, for example, requires an electric wire to be connected directly to the moving carriage, which arrangement could ultimately cause fraying or wear of the wire that could result in a short circuit.

Although most toasters are constructed to toast bread in separate bread receiving chambers, it is desirable at times to toast either normal size bread in edge-to-edge relationship, or long single slices, such as lengthwise-sliced French-style bread in a single elongated chamber. Because of the large elongated chamber, however, there are significant problems encountered in providing uniform toasting of the bread.

SUMMARY OF THE INVENTION

It is therefore an important object of this invention to provide an improved toaster having a highly reliable and efficient control for the timing and heating system.

It is another object of this invention to provide an improved arrangement for timing the toasting cycle wherein the electrical parts in particular are not subjeced to undue wear.

It is a further object of this invention to provide an improved toaster construction wherein the toast is uniformly browned in an elongated toasting chamber wherein the toast is in edge-to-edge relationship.

It is also an object of this invention to provide an improved toaster construction which is reliable and yet highly simple and economical in construction and manufacture.

Further purposes and objects of this invention will appear as the specification proceeds.

Among the inventive improvements in the present invention is the provision of an electrical switch which is fixedly mounted on a fixed support member for the entire toaster structure, and which is operated by a cam carried by the moving bread carriage. When the cam strikes the switch, current flow in the heating coil which heats the bimetal. A switch is also mounted on the base portion of the fixed toaster support and which is operated as the bread carriage moves to the lowermost toasting position for operating the heating coils. Other improvements in our strucure include the unique formation of the heating coils to provide highly uniform heating of bread in an elongated toasting chamber. The heating coils are on opposite sides of the chamber in the form of upper and lower sinusoidal formation of a heating wire.

BRIEF DESCRIPTION OF THE DRAWINGS

FIGURE 1 is a perspective view of our improved toaster;

FIGURE 2 is a fragmentary longitudinal cross-sectional view showing the internal construction of the improved toaster of FIGURE 1;

FIGURE 3 is a fragmentary sectional view of one end of the toaster taken along the line 3—3 of FIGURE 2;

FIGURE 4 is a transverse cross-sectional view through our toaster taken along the line 4—4 of FIGURE 2;

FIGURE 5 is an end elevational view of a cam operated switch used for controlling the bimetallic heating coil;

FIGURE 6 is a side elevational view of the switch of FIGURE 5;

FIGURE 7 is a top plan view of the bimetallic latching mechanism carried by the bread carriage;

FIGURE 8 is a simplified circuit diagram for the heating elements of the toaster;

DESCRIPTION OF THE PREFERRED EMBODIMENT

Figure 9:
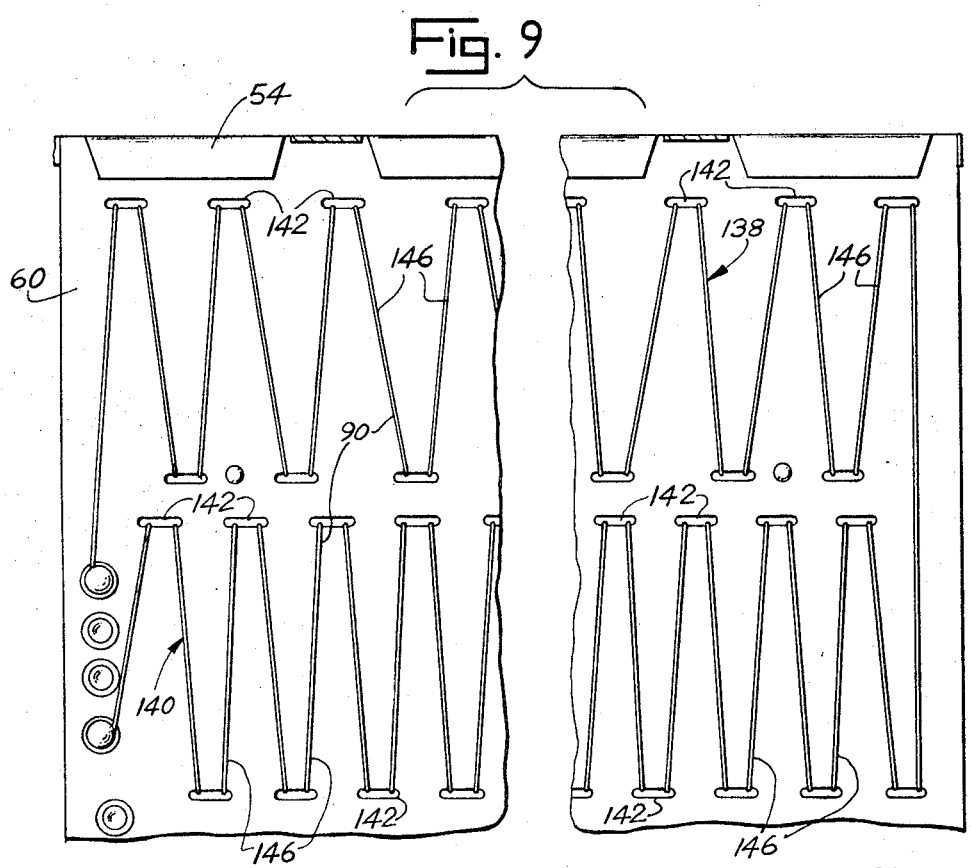
FIGURE 9 is a detailed view of the sinusoidal form of the heating coils used in our improved toaster.
Figure 10:
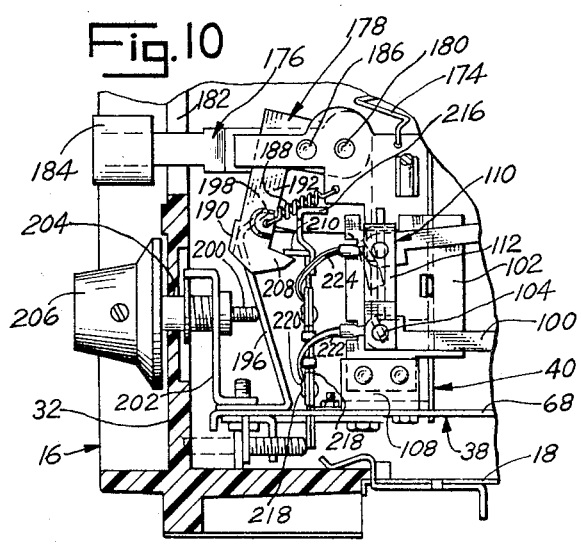
FIGURE 10 is a detailed side view of the latching mechanism in the lowermost toasting position.
Figure 11:
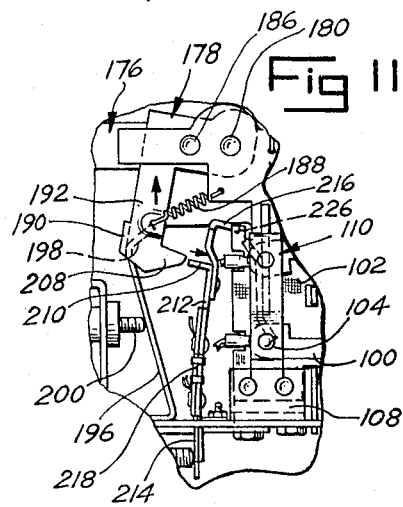
FIGURE 11 is a detailed view similar to FIGURE 10, except the latching mechanism is shown with the bread carriage in the slightly raised position.

Referring to the drawings, the toaster, generally 10, includes an outer decorative sheet metal shroud or cover 12 and insulating end plates 14 and 16 of molded plastic at opposite ends of the cover 12. The toaster 10 is also provided with a hinged bottom plate 18.

The cover 12, preferably made of plated steel, provides an elongated top panel 20 and a pair of downwardly extending side walls 22. The opposite ends of the cover 12 are open. The top 20 includes an elongated bread receiving aperture 24 which is sized to receive at least two normal-sized pieces of bread positioned edge-to-edge. Each side and end of the bread receiving aperture 24 includes a downwardly extending flange 26 to avoid raw edges surrounding the aperture 24. The opposite ends of the cover 12 also have inwardly extending flanges 28. Each of the three flanges 28 have openings through which screws may be passed to secure the cover in place. The end 30 of the cover 12, at both the top and sides, telescopes within the end plate 16.

Each end plate 14 and 16 is molded of a suitable heat and electrical insulating material, such as a thermosetting phenolic. In both end plates 14 and 16, the outer faces 32 are recessed. The end plate 14 fits flush against the flanges 28 at one end of the cover 12 and includes apertures which are coextensive with apertures in the flanges 28 so that fastening screws 34 may be passed therethrough. The end plate 16 telescopes over the recessed outer face 30 of the cover 12 and the end plate 16 includes apertures which are coextensive with apertures provided in the flanges 28 of the recessed end 30 for receiving the mounting screws 34. The bottoms 36 of the end plates 14 and 16 lift the bottom plate 18 upwardly from a horizontal surface.

Referring particularly to FIGURES 2, 3, and 4, the internal construction of the toaster 10 includes a lower mounting base 38 and an upright support frame 40. The base 38, preferably constructed of sheet steel, includes downturned side flanges 42 and downturned ends 44 and 46. The frame 40 comprises a pair of upright end plates 48 and 50 secured to the base 38. Advantageously, the plates 48 and 50 are secured to the base 38 by interengagement of apertures (not shown) in the base 38 with tongues 52 on the lower edges of the plates, which are deformed to provide locking of the upright plates 48 and 50 to the base 38. The support plates 48 and 50 are joined together at their upper ends by an upper cross support 54 which has the shape of an elongated rectangle and is riveted to the upper ends of both plates 48 and 50 to provide for rigid interconnection. Intermediate members 56 are provided midway between the upper cross-support 54 and the base 38. The intermediate members 56 cooperate with the elongated said portions of the upper cross-support 54 and upright channel defining projections 58 in the base 38 to provide rigid support for mica heating element support plates 60 which are in parallel, spaced relationship to define opposite sides of the bread toasting chamber 62. The intermediate cross-supports 56 are riveted to the mica plates 60. The upper ends of the mica plates 60 are received in channels defined in the lower edges of upper cross-support 54.

The interior of the bread toasting chamber 62 includes a pair of bread guides 64 mounted to the elongated sides of the upper cross-supports 54 and to the lower ends of the base 38. The upright guides 64 are slanted inwardly towards each other at their upper portions to guide and properly space the bread from the heating coils. The base 38 has large open portions 68 therein which are separated by integral cross-supports 70. The openings 68 permit the passage of crumbs and the like to the swinging bottom plate 18.

A pair of projections 72 at one end of the bottom plate 18 engages apertures in the downturned end 46 of the base plate 38 to provide for swinging or hinged engagement therebetween. The opposite end of the bottom plate 18 includes a lock member 74 which is slidable into engagement with the upper surface of the bottom of the end plate 16 so as to normally lock the swinging bottom plate 18 in the closed position.

One of the important features of the present invention is found in the combination of parts comprising the electrical heating system for the toaster. An electrical power source is brought in through a suitable aperture provided in the lower end of the end plate 14 and then through another aperture provided in the downturned end 46 on the base 38. The leads 76 of the power source are connected to a pair of upright terminal posts 78 mounted at one end of the base 38. The terminals 78 pass through apertures provided in the base 38 and are insulated from the metal base 38 by upper and lower insulator plates 80. The upper insulator plate 80 is inserted between the bottom flange 82 of the terminal post 78 and the base 38, and the lower insulator plate 80 is inserted between the base 38 and a mounting nut 84 which secures each terminal to the base 38. The terminals 78 are secured to the leads 76 by insertion between mounting nuts 84 and 86.

The upright terminals 78 cooperate with a pair of flexible switch elements 88 of copper or other suitable electrical conducting metal to cause current to flow to the bread toasting or heating elements 90 which are secured to the mica plates 60. The switch elements 88 include an upright portion which is secured by suitable means, such as a rivet 92, to a lower corner of each of the mica plates 60. An insulator plate 94 is interposed between the upright portion of each switch element 88 and one of the mica plates 60 and the frame 40. An inwardly extending vertically swingable portion 96 has a contact 98 mounted thereon which is aligned with the upper end of each of the terminals 78 to provide for current flow to or from each terminal 78 to each switching element 88.

One of the switching elements 88 is an electrical connection with an elongated current carrying member 100 mounted on the mica plate 60 by the rivet 92. The opposite end of the elongated member 100 is secured to an insulating plate 102 by a rivet 104.

The insulating plate 102 is secured to a bracket 108 which is mounted on one end of the upper surface of the base 38. The insulating plate 102 has a normally closed switch 110 positioned thereon. A conducting strip 112 of springable material is also secured to the insulating plate 102 by the rivet 104. A contact rivet 114 is secured to the springable strip 112 and is aligned with a contact 116 which is secured to the upper portion of the insulating plate 102. The springable strip 112 normally biases the contact rivet 114 into electrical contact with a fixed contact 116 so that current flows from the elongated conducting member 100 through the switch 110 and to a second elongated conducting member 118.

The opposite end of the second elongated conducting member 118 is mounted above the first conducting member 100 and is secured to a mounting strip 120. The mounting strip 120 and the elongated conducting member 118 are secured to the mica plate 60 by rivets 122.

On the inner surface of the mica plate 60, one end of the wire heating element 90 is mounted. Generally, a rigid U-shaped connecting element passes around the end of the frame 40 and is mounted to both support plates 60. Rivets mount one end of the second heating element 90 to the U-shaped connector 124 to thereby connect the heating elements on opposite sides of the bread toasting chamber 62 in parallel connection.

The other of the switch elements 88 is mounted to the opposite mica plate 60 by a rivet (not shown), which, similar to the rivet 122, secures one end of the opposite heating element to the other mica plate. An upright, flat connecting element (not shown) is mounted to the opposite mica plate 60 and is in electrical connection with a second U-shaped current carrying element 132 which passes around the end of the frame 40 and is electrically connected to a connecting element 134 mounted on the outer surface of the mica plate 60.

A rivet 135 secures the connecting element 134 to the mica plate 60 and also secures the opposite end of the heating element 90 to the inner surface of the mica plate 60 so that the heating elements are in parallel connection.

The particular conformation of the heating elements 90 along the inner surfaces of the mica plates 60 is one of the important features of the present invention. Particularly in a toaster of the type having an elongated bread aperture 24 for receiving two slices of bread positioned edge to edge, there is a problem of having uniform browning of the bread within the toaster regardless of the particular position of the bread in the toaster or of the particular portion of a piece of bread being toasted. The form of the heating elements provides for a highly uniform browning of the toast. Each of the heating elements 90 comprises a wire of high electrical resistance to provide the necessary heat for the browning of the toast. Upper and lower sinusoidal waves 138 and 140 are provided on both the upper and lower paths of the heating elements 90.

Each heating element 90 is secured to the mica plates 60 in a simple and highly effective manner. Transverse slots 142 are provided at spaced intervals in the wall of the mica plate 60. At the upper and lower ends of each sinusoidal path of each heating element 90, the heating element wire 90 includes a plurality of loops 144 which pass through each of the slots 142. Each loop 144 is pressed into secure engagement with the outer surface of the plate 60 to provide for the desired engagement.

It is also important that the spacing between each of the sinusoidal waves 146 in the lower path 140 is closer together than the waves 146 in the upper sinusoidal path 138, because much of the heat from the lower path rises upwardly, requiring more concentrated heat in the lower path 140. Furthermore, in the upper heating path 140, the spacings of the sinuations 146 are farther apart at the center of the path than at the ends to provide for the desired uniformity in toasting. The described parallel connection of the heating elements 90 also contributes to the uniform browning of the bread in the toaster. The heating element wires 90 are spaced slightly from the mica boards 60, as about 1/64 or 1/32 of an inch, to also provide for more uniform heating of the bread. This spacing of the wire from the mica board permits the wire to radiate heat faster to the toast in the first cycle of operation. This avoids the problem of delaying the radiation of heat to the toast in the first toasting cycle since the mica support plates would absorb much of the heat if the heating elements 90 were contacting the mica plates 60.

A vertically movable bread carriage, generally 148, is movable within the bread toasting chamber 62 between the bread guides 64. The carriage 148 extends across the elongated chamber 62 and is guided in the ends 48 and 50 of the frame 40. Each of the end plates 48 and 50 includes aligned elongated vertical slots 150 which receive outwardly projecting elongated guide portions 152 and 154 on the carriage 148. Each of the guide portions 152 and 154 has an aperture 156 therein. A U-shaped bar 158 is rotatably carried by the frame 40. The base of the bar 158 is cradled within hook portions 160 which project outwardly from opposite edges of the end plates 48 and 50 of the frame 40, the hook portions 160 being integral with the frame cross-supports 56. The base of the U-bar 158 is rotatably carried therebelow. The upright legs 162 of the adjusting bar 158 pass through the apertures 156 in the guide portions 152 and 154. The legs 162 are in substantial alignment so that as the carriage 148 slides up or down, both ends of the carriage 148 move substantially the same distance.

The lower end of the guide portion 152 cooperates with a pivoted spring member 164 which causes the switch elements 88 to activate the heating elements 90. The spring 164 includes a coiled portion, an upper end 166 and a lower end 168. The upper spring end 166 is guided by an L-shaped bracket 170 mounted on the frame end member 50 so as to slidably confine the spring end 166 between the bracket 170 and the frame end 50. The lower end of the carriage projection 152 of the carriage 148 strikes the upper spring end 166 in its downward movement. The lower spring end 168 engages an insulator element 172 which interconnects the switch elements 88. When the carriage moves down, the lower spring end 168 is pivoted to force the insulator plate 172 and the free ends of the switch elements 88 downwardly. The rivet contacts 98 of the switch elements 88 are thereby moved substantially uniformly into contact with the upper ends of the upright terminals 78.

The carriage 148 is normally biased to the raised position by a coiled tension spring 174. One end of the spring 174 is connected to the upper cross-support 54 and the opposite end of the spring 174 engages a suitable aperture in the guide portion 154 so that the carriage 148 is normally pulled to the raised position.

Another important feature of the present invention is the particular construction of the mechanism used for timing the toasting period. The present invention utilizes a bimetallic element and effectively uses both the heating time and cooling time for the total heating cycle. This structure provides a highly economical and simple timing element for the toasting cycle and cooperates with the heating elements to provide a highly uniform toasting cycle for bread regardless of the particular cycle of operation of the toaster.

The guide portion 154 of the carriage 148 has a handle plate 176 and a latch plate 178 pivotally mounted thereon. A rivet 180 pivotally secures both the handle plate 176 and the latch plate 178 to the guide portion 154 so that both plates 176 and 178 have a common pivot point. The handle plate 176 extends through the vertically elongated slot 182 in the insulating end plate 16. A decorative handle 184 is secured to the outwardly projecting handle plate 176 so that the carriage 148 may be manually forced downwardly into the toasting position. The handle 184 is located in the recessed outer face of the plate 16.

The latch plate 178 is pivotally mounted between the handle plate 176 and the guide portion 154. The latch plate 178 includes an arcuate aperture which slidably engages a rivet 186 which is carried by the guide portion 154. Since the rivet 186 passes through the arcuate slot on the latch plate 178, the latch plate 178 is limited in its pivoting movement about the pivot point 180. A tension spring 188 is connected at one end to the latch plate 178 and at its opposite end to the guide portion 154 so as to normally bias the latch plate 178 into the operative position. The latch plate 178 also includes an integral laterally extending time adjusting flange 190 and an integral downwardly extending leg 192. When the carriage 148 is in the raised position, the inner surface of the flange 190 normally engages a downwardly extending finger (not shown) on the lower outer corner of the handle plate 176 so as to prevent the spring 188 from biasing the latch plate 178 beyond the desired operating position.

A flexible time adjusting leaf spring member 196 is mounted to the base 38 and extends upwardly therefrom. The upper end of the timing leaf spring 196 includes an inwardly extending cam portion 198 which is aligned readjusting flange 190 of the latch plate 178.

The relative position of the timing spring 196 is adjusted by a manually movable screw 200 which bears against the outer portion of the timing spring 196. The adjusting screw 200 is threadably received by a threaded aperture in an upright support bracket 202. The adjusting screw 200 passes outwardly through an aperture 204 in the outer face of an end plate 16 at a position below the elongated slot 182. A time adjusting knob 206 is positioned thereon so that the timing spring 196 may be moved inwardly or outwardly a desired amount so that the toast is toasted to the desired degree of brownness. The lower end of the downwardly extending leg 192 has a latch element 208 which extends inwardly for engaging an outwardly extending or hook portion 210 mounted on a bimetallic member 212. The amount of inter-engagement between the hook elements 210 and the latch element 208 is proportional to the amount of time that the toast is to be toasted. The greater the inter-engagement, the longer will be the toasting time while the shorter the amount of inter-engagement, the shorter will be the period of toasting.

The bimetallic member 212 is mounted to the toaster base 38 by a bracket 214. At the top end of the bimetallic assembly 212, there is riveted a plate with two ears or hooks. The lower hook 210 projects in a direction away from the toaster chamber. A slightly raised hook element 216 is also mounted on the heat movable bimetallic member and projects inwardly towards the toasting chamber. Insulator plates 218 are positioned on opposite sides of the bimetal 212. An electric heating coil 220 is wound about the insulators 218 for imparting heat to the bimetal 212. The heating coil 220 is connected by a wire 222 to the rivet 104 for electrical connection to one side of the switch 110. Another wire 224 connects the heating coil 220 to the contact rivet 116 on the insulating plate 102. As will be explained hereinafter in greater detail, when the bread carriage is in the lowermost toasting position and the latch element 208 and lower hook element 210 are in inter-engagement, the switch 110 is open so that current flows through the wire 222 to the coil 220 and then through the wire 224 to the other side of the switch 110. At other times, the switch 110 is closed so as to short circuit the heating coils 220.

The upper hook 216 on the bimetallic assembly 212 is constructed to inter-engage with a stop element 226 projecting outwardly from the guide portion 154 of the bread carriage 148. As the bimetal 212 is heated by the heating coil 220, it gradually biases inwardly towards the toasting chamber until the latch element 208 and hook element 210 move out of engagement. When this occurs, the biasing spring 174 causes the carriage 148 to rise. The stop element 226 on the carriage 148 engages the underside of the upper hook element 216 to stop the carriage 148 after rising only a relatively small distance.

A cam insulator plate 228 extends laterally from one side of the guide portion 154 for contacting an inwardly extending actuating portion 230 of the switch element 112. The cam plate 228 includes an outer step 232 and an inner step 234. When the actuating portion 230 engages the outer step 232, the switch 110 is opened so that current flows to the heating coil 220. This will cause the heating element 220 to heat the bimetal until there is disengagement between the latch 208 and the hook 210. As the carriage 148 moves upwardly to engagement between the stop 226 and the upper hook 216, the switch actuating portion 230 engages the inner step 234 to close the switch element 112 and short circuit the heating coil 220.

The relative position of the unheated bimetal assembly 212 is manually adjustable by an adjusting screw 236 which is threadably mounted on a bracket 238 secured to the underside of the base 38. The adjusting screw 236 bears against the bimetal mounting bracket 214 so as to bias the bimetal 212 and adjust the relative inter-engagement between the stop element 226 and the upper hook 216.

When lowering the bread carriage 148, a stop member (not shown) is mounted on the frame end plate 48 to engage one of the legs 162 of the U-shaped bar 158 so as to limit the downward movement of the carriage 148. A cover plate 242 is mounted on the base 38 to provide an enclosed chamber for the electrical leads 76 connected to the terminals 78.

Although it is believed that the manner of operation of the toaster structure 10 should be clear from the foregoing, a brief description of the operation will be provided for a more complete understanding of the invention.

When a person desires to toast bread, the slices of bread are placed side by side within the elongated toasting chamber 62 between the bread guides 64. The bread is supported on the vertically movable carriage 148. The handle 184 is then grasped and moved downwardly until the bread is down in the toasting position. As the bread carriage 148 is moved downwardly, the outwardly extending carriage guide portion 152 contacts the upper end of the spring 164 which ultimately causes the lower spring end 168 to bias the insulator element 172 downwardly and move both switch elements 88 into electrical contact with the upper ends of the terminals 78. When the switch elements 88 are thus closed, current flows to the heating coils 90 on opposite sides of the bread chamber 62.

During movement of the carriage 148 to the lowermost toasting position, the cam plate 228 contacts the actuating portion 230 of the switch conducting strip 112. When the outer step 232 engages the conducting strip at 230, the switch 110 is opened and current flows through the wire 222 to the bimetallic heating coil 220.

As the handle plate 176 moves the carriage 148 downwardly, the flange portion 190 of the latch plate 178 slidably engages the upper end of timing spring 196 and the latch element 208 passes below the lower hook element 210 on the bimetallic assembly 212 until there is engagement therebetween so the carriage is held in the lowermost toasting position. The spring 188 biases the latch element 208 into firm engagement with the hook element 210. As the coil 220 heats, the bimetal asembly 212 heats and becomes distorted so as to move in a direction away from the latch element 208 and towards the toasting chamber 62. At all times when the latch 208 engages the hook element 210, the user may manually raise the carriage 148 simply by pivoting the handle plate 176 upwardly so that the finger 194 contacts the flange 190 to manually disengage the latch element 208 from the hook element 210.

As the bimetal heats and moves toward the bread chamber 62, the amount of engagement between the latch 208 and the hook 210 decreases until there is disengagement between the latch 208 and the hook 210. At the instant of disengagement, the raising spring 174 lifts the carriage 148 upwardly. The carriage 148, however, is limited in its upward movement since the stop element 226 on the carriage 148 moves up and engages the fixed upper hook element 216 on the bimetal assembly 212. Thus, the carriage 148 moves upwardly only slightly from the lowermost toasting position.

As the carriage moves slightly upward, the conducting strip at 230 moves into engagement with the inner step 234 of the cam 228. This closes the switch 110 to short circuit the heating coil 220. Since current stops flowing through the heating coil 220, the bimetal 212 cools off and moves back to its starting position. The switch elements 88 remain in contact with the terminals 78 as long as the upper hook element 216 remains in engagement with the stop element 226. As the bimetal 212 cools and moves back to its starting position, the upper hook 216 disengages from the stop element 226. The raising spring 174 then raises the carriage 148 to the fully raised position, and the toasted bread may be taken from the toaster.

When the upper hook 216 is in engagement with the stop element 226, the operator may also manually retrieve the bread by rotating the handle plate 176 upwardly. As shown in dotted lines in FIG. 2, downwardly extending arm 244 on the handle plate 176 is provided and is interposed between the bimetal assembly 212 and the frame 40 when the carriage is in the lowered position. The arm 244, when aligned with the bimetal assembly 212, engages it to pivot it and thereby the upper hook 216 away from engagement from the stop element 226. Thereby, the toaster carriage 148 is manually raised.

It is one of the important features of the invention that adjustability be provided for the heat up and cool down time. The adjusting screw 200 moves the timing spring 196 inwardly or outwardly so as to adjust the relative engagement between the latch 208 and hook 210. In a similar way, the adjusting screw 236 adjusts the amount of relative engagement between the upper hook element 216 and the stop element 226 on the carriage 148. In both cases, the amount of engagement between the hooks on the bimetal and the stop element 226 and the latch element 208 are directly proportional to the time that a slice of bread remains in the toaster.

From the foregoing description, it is seen that we have provided a highly simple and economical, yet highly reliable, toaster construction. The bimetal heat up-cool down timing mechanism cooperates with the particular formation of the heating coil 90 on mica support plates 60 to provide for a highly uniform and reliable toasting of bread to the desired degree of brownness. The toaster 10 is highly simple in construction and all the electrical parts are substantially free of wear and abrasion. No electrical part of the toaster 10 moves with the bread carriage 148 and all electrical switch elements are fixed to the frame and are responsive to the movement of the carriage to and from the toasting position.

While in the foregoing there has been provided a detailed description of a particular embodiment of the present invention, it is to be understood that all equivalents obvious to those having skill in the art are to be included within the scope of the invention as claimed.

What we claim and desire to secure by Letters Patent is:

1. In an improved bread toaster of the type having a support member enclosing a bread toasting chamber, a bread carriage movably carried by said support member between a raised position and a lowered toasting position, means biasing said carriage to the raised position, heating elements mounted on said support member, a bimetallic member mounted on said support member, first and second hook members carried by said bimetallic member, a heating coil carried by said bimetallic member so that as heat is applied to said coil, said bimetallic member moves in one direction and as said coil cools, said bimetallic member moves in an opposite direction, and a first hook engaging member carried by said carriage for engaging said first hook member to hold said carriage in the lowermost toasting position, the improvement comprising first switch means fixedly mounted directly on said support member for activating said heating elements, second switch means fixedly mounted directly on said support member, cam means mounted on said carriage for operating said second switch means to cause current flow in said heating coil when said carriage is in the lowermost toasting position, and a second hook engaging means fixedly mounted directly on said support member for engaging said second hook member on said carriage in a position slightly raised from said lowermost position, said first hook member and said first hook engaging means becoming disengaged as said bimetallic member moves in said one direction to a predetermined position, said second hook member and said second hook engaging means becoming engaged upon disengagement of said first hook member from said first hook engaging means, said second switch means becoming deactivated by said cam means to stop current flow to said heating coil, and as said bimetallic member cools, said second hook member becomes disengaged from from said hook engaging means to permit said biasing means to raise said carriage to the fully raised position.

2. The device of claim 1 wherein said first hook engaging means is swingably carried by said carriage, first adjusting means are mounted on said support member for adjusting the relative amount of engagement between said first hook and said first hook engaging means, and second adjusting means mounted on said support member for adjusting the relative engagement between said second hook and said second hook engaging means.

3. The device of claim 2 wherein said carriage swingably carries a handle member for moving said carriage to the lowermost position, said first hook engaging means being swingable on the same axis as said handle, engagement means between said handle and said first hook engaging means for manual disengagement of said first hook from said first hook engaging means, and means carried by said handle for moving said bimetallic member to manually disengage said second hook and said second hook engaging means.

4. The device of claim 1 wherein said second switch means is normally in the closed position for short circuiting said bimetallic member heating coil, except when said carriage is in the lowermost position, and said cam means permitting said switch to short circuit said heating coil as said carrage is raised to said slightly raised position.

5. The device of claim 1 wherein said heating chamber is elongated for receiving at least two slices of bread therein.

6. The device of claim 5 wherein said heating elements are in parallel connection, mica support plates are carried by said support members, said heating elements are carried by said mica plates, and said mica plates define the opposite sides of said elongated chamber.

7. The device of claim 6 wherein said heating elements are in form of sinusoidal wires spaced outwardly from said mica paltes, each of said mica plates having upper and lower sets of sinusoidal shaped heating elements.

8. The device of claim 7 wherein said mica plates include a plurality of apertures therein, said heating elements are looped therethrough to be engaged to the surface of said mica plates.

9. The device of claim 8 wherein the spacing of the sinusoidal heating elements is spaced closer together on the lower of said heating elements than on the top of said heating elements and the sinuations of the top heating elements are farther apart in the middle than at the ends for proper heat distribution to bread being toasted.

10. In a toaster-heating element of the type consisting of a non-conductive mounting plate carrying a shape-retaining heating wire formed to a desired shape and adapted to toast an upright bread slice, the improvement of arranging the heating wire on the mounting plate in spaced upper and lower elongated, horizontal runs each of sinusoidal character so as to provide upper and lower sets of generally upright, exposed heater wire segments, and the lateral spacing of the exposed upright heater wire segments in the lower set being closer than the lateral spacing of upright heater wire segments in the upper set.

11. A toaster-heating element as set forth in claim 10 wherein the lateral spacing of upright heater wire segments in the upper set is closer together at the ends of said upper set than in the middle of said upper set so as to provide for more uniform heat distribution to a slice of bread being toasted.

12. A toaster-heating element as set forth in claim 10 wherein the heating wire is shaped and arranged so that the upright exposed heater wire segments are spaced slightly from the mounting plate to provide faster heat radiation to a bread slice in the first cycle of a toasting operation.

13. In an improved control for an electrically energized bread toaster of the type having a bread carriage movable relative to a support between a raised, non-toasting position and a lowered, toasting position in which latter position means are to be activated for forcing the carriage to rise at the end of a toasting period, and first and second latch members are carried by a movable bimetallic member that is arranged to be separately heated to move the latch members relative to a latching position in opposite direcitons to latch in different positions, and so as to time out a toasting cycle by the time lapse accompanying alternate heating and cooling of the bimetallic member; the improvement comprising a first normally open switch means on said support for controlling energization of both the toaster and the separate heater for the bimetallic member, a second normally closed switch on the support for shunting the separate heater for the bimetallic member, means on said bread carriage for engaging the first latch member to hold the carriage in lowered position and for engaging and closing the first switch means and for engaging and opening the second switch means carried on said support so as to heat both the toaster and the separate heater, stop means on said carriage positioned to be engaged and held by the said second latch member as the second latch member is moved by the heated bimetallic member and upon the carriage raising slightly from the lowered position at which the first latch member held the carriage, means on the carriage maintaining the first switch means closed and the toaster heated during the slight raise of the carriage to an intermediate position where the second latch member is engaged, means on the carriage for closing the second switch means upon the carriage moving to the intermediate position, whereupon the heater for the bimetallic member is shunted and cools thereby moving the second latch member away from engagement with the carriage so as to release the carriage and permit it to rise.

14. A device as in claim 13 in which the bimetal extends longitudinally in an upright attitude with the two latch members located at the upper extended end of the bimetallic member.

References Cited

UNITED STATES PATENTS

| | | | |
|---|---|---|---|
| 2,274,810 | 3/1942 | Sardeson | 99—329 |
| 2,315,327 | 3/1943 | Gomershall | 99—329 |
| 2,344,842 | 3/1944 | Weeks | 99—329 |
| 2,517,697 | 8/1950 | Molaws | 99—329 |
| 3,029,725 | 4/1962 | Parr | 99—329 |
| 3,242,294 | 3/1966 | Kauffman | 99—329 XR |
| 3,361,053 | 1/1968 | Jepson et al. | 99—329 |

BILLY J. WILHITE, Primary Examiner.

U.S. Cl. X.R.

99—391, 400; 200—136.3; 219—546